April 9, 1940.  E. W. SAIBERLICH  2,196,645
CROP PICK-UP CUTTER
Filed Feb. 11, 1938  4 Sheets-Sheet 1

INVENTOR
ERWIN W. SAIBERLICH
BY
ATTORNEYS

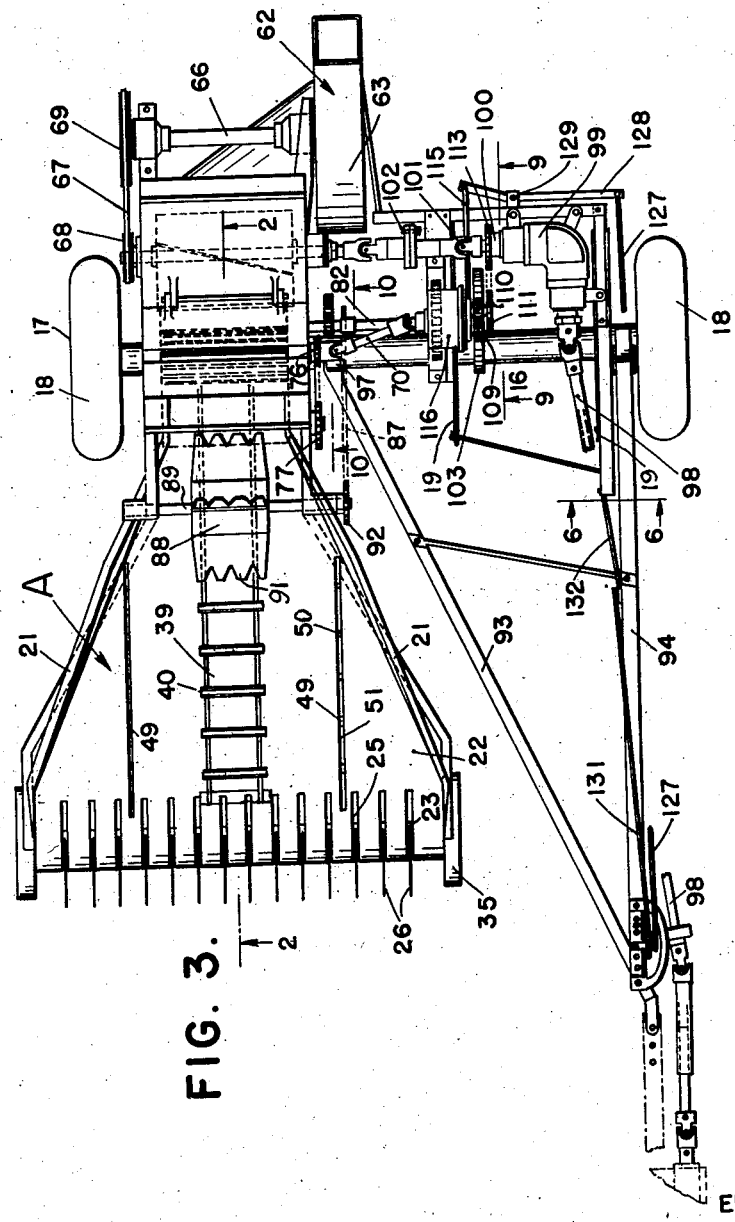

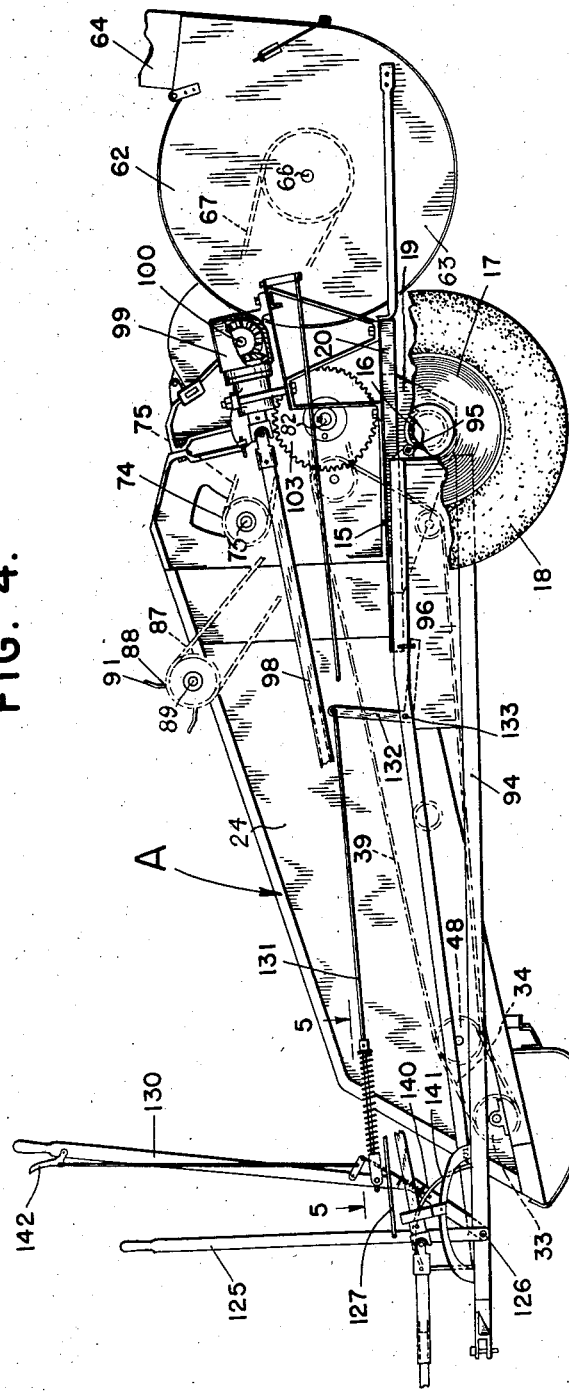

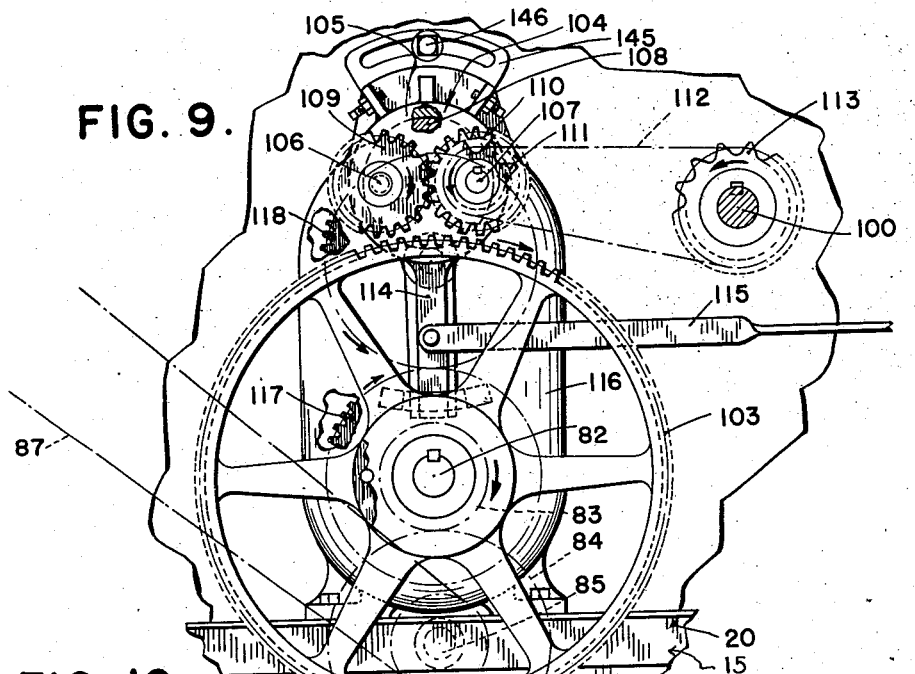

Patented Apr. 9, 1940

2,196,645

UNITED STATES PATENT OFFICE 2,196,645

CROP PICKUP CUTTER

Erwin W. Saiberlich, Appleton, Wis., assignor to Fox River Tractor Company, Appleton, Wis.

Application February 11, 1938, Serial No. 190,010

1 Claim. (Cl. 146—118)

This invention appertains to farming machinery, and more particularly to a novel machine for picking up crops from the field and cutting the same incident to the storing of the crops in barns and the like.

One of the primary objects of my invention is to provide a machine for harvesting forage, hay, grain, and straw crops, which is of such a construction as to pick up the crops from the field and to convey the picked-up material to a cutter on the machine, and to then deliver the cut material to a following wagon or truck by the use of a suitable blower or conveyor carrier mounted on and driven from the machine.

Another salient object of my invention is to provide a machine for quickly and expeditiously gathering straw and the like from a field without the strenuous labor generally attached thereto, and for simultaneously cutting up the straw during the travel of the machine, whereby the straw will be reduced in bulk to facilitate the transporting thereof from a field and over a roadway without the use of large cumbersome hay wagons, and to permit the storage of a greater quantity of surplus crops without the necessity of erecting additional buildings.

A further object of my invention is to provide a machine which will harvest straw and like crops with an expenditure of a minimum amount of time and labor, whereby the crops can be properly harvested during favorable weather conditions, and thereby lessen the loss from crop spoilage.

A further object of my invention is to provide a unitary crop pickup and cutter which can be conveniently drawn from and driven by a tractor and controlled or manipulated by the operator of the tractor from his seat, whereby the necessity of using additional help to operate the machine is eliminated.

A further important object of my invention is to provide a unitary crop pickup and cutter in which a wide feed table is provided for receiving the straw or other material from the pickup fingers, and which narrows back to the cutting mechanism, the table having conveying means thereon for carrying the straw to the cutting mechanism.

A further object of my invention is to provide novel means on the rear end of the table for insuring the proper delivery of the straw or the like to the cutting cylinder.

A further object of my invention is to provide means for stopping the delivery of the material to the cutter and for reversing the direction of travel of the feed rolls of the cutter, when necessity arises.

A further object of my invention is to provide means for operating all of the parts of the machine, such as the pickup fingers, conveyors, beater head, treading roll, feed rolls, cutter and blower or carrier from a single main drive shaft, which can be either driven from the power take-off shaft of the pulling tractor or from a supplemental engine mounted on the machine.

A still further object of my invention is to provide a novel and rugged wheeled frame for the machine, and to so balance the machine on the axle thereof that little weight will be carried by the drawbar of the tractor or the pick-up shoes.

A still further important object of my invention is to provide means for adjusting the feed table with the pickup fingers and shoes on the frame, whereby the pickup shoes can be positioned to engage the ground very lightly or to clear the ground entirely to permit the fast moving of the machine from one field to another.

With these and other objects in view, the invention consists in the novel construction, arrangement, and formation of parts, as will be hereinafter more specifically described, claimed, and illustrated in the accompanying drawings, in which drawings:

Figure 3 is a top plan view of the machine.

Figure 4 is a side elevational view of the machine, with parts thereof broken away and in section to illustrate structural details.

Figure 5 is a fragmentary, detail sectional view taken substantially on the line 5—5 of Figure 4, looking in the direction of the arrows, illustrating the connection between the frame adjusting lever and its pull rod.

Figure 6 is an enlarged, detail transverse section taken on the line 6—6 of Figure 3, looking in the direction of the arrows, illustrating the connection between the frame of the machine and the adjusting lever.

Figure 9 is an enlarged, detail sectional view taken on the line 9—9 of Figure 3, looking in the direction of the arrows, illustrating the means for stopping and reversing the feed to the cutting cylinder.

Figure 10 is a view similar to Figure 9, taken on the line 10—10 of Figure 3, looking in the direction of the arrows, illustrating the means employed for operating various parts of the mechanism.

Figure 11 is a detail sectional view taken substantially on the line 11—11 of Figure 10, looking in the direction of the arrows, illustrating the means employed for preventing operation of the pickup fingers and the table conveyors during the reversing of the feed rolls for the cutting mechanism.

Figure 1:
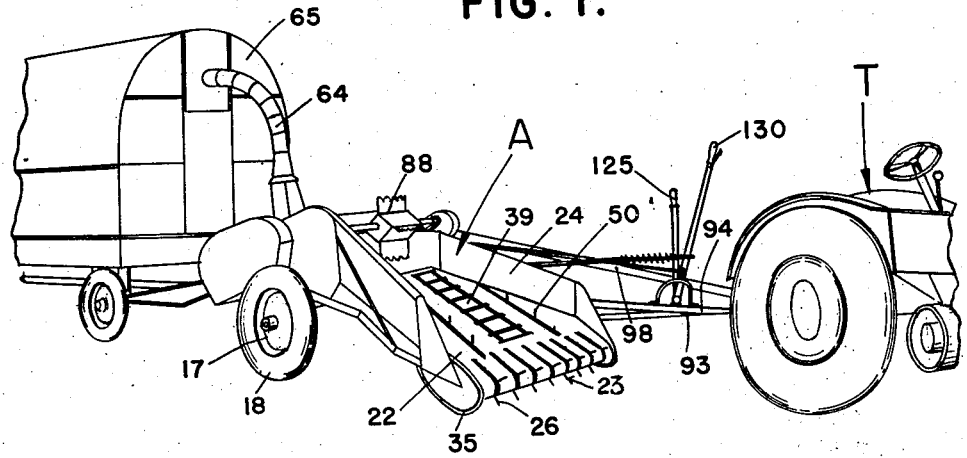
Figure 1 is a perspective view illustrating my improved machine in use, and showing the same attached to and operated from a tractor and pulling a following wagon for receiving the cut material.
Figure 2:
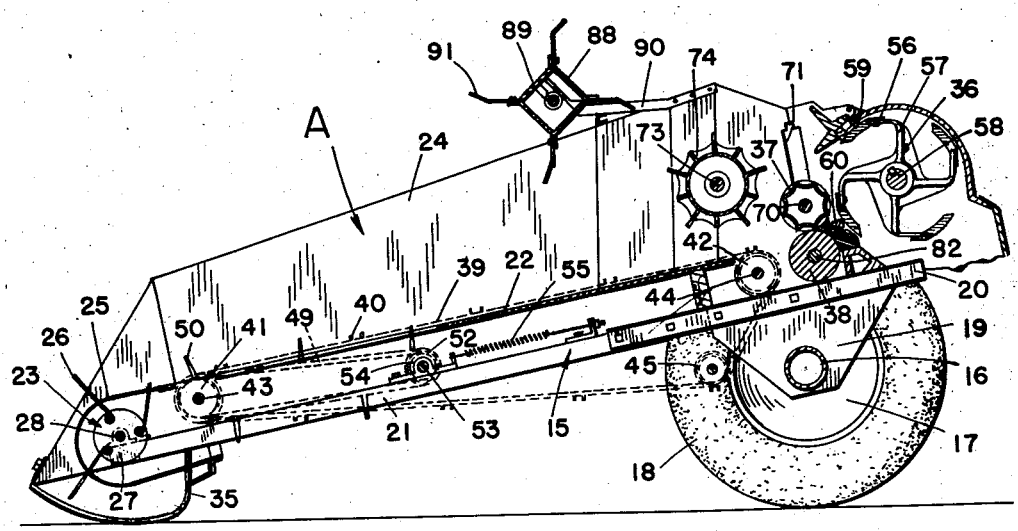
Figure 2 is a longitudinal section through the improved machine, taken on the line 2—2 of Figure 3, looking in the direction of the arrows.
Figures 7, 8:
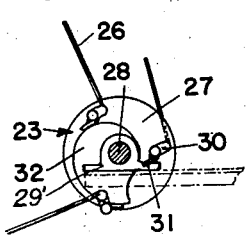
Figure 7 is a detail, fragmentary sectional view, illustrating the means for operating the fingers of the pickup mechanism.
Figure 8 is a detail, fragmentary plan view, illustrating the means for operating the pickup fingers.

Referring to the drawings in detail, wherein similar reference characters designate corresponding parts throughout the several views, the letter A generally indicates my improved machine, which comprises a frame 15 on which the various parts are mounted.

This frame 15 includes a hollow dead axle 16 preferably of tubular form, and the opposite terminals of the axle carry stub shafts or spindles on which are rotatably mounted the ground wheels 17. These ground wheels 17 have preferably mounted thereon pneumatic tires 18. Rigidly secured to the tubular axle 16 at spaced points are frame plates 19, and these plates can be welded in position, if desired.

The two frame plates 19, at the right-hand side of the frame (referring to Figure 3), have welded or otherwise secured thereto channel or like structural beams 20, and these beams in turn have secured thereto forwardly extending beams 21, which in turn carry the feed table 22 and the pickup cylinder 23. The beams 21 diverge downwardly and forwardly, and the feed table flares toward the front of the machine. Suitable side walls 24, formed from metal or the like, can be provided for the feed table. The front of the table curves over the pickup cylinder and is provided with a plurality of cleaning slots 25, through which extend the spring steel pickup fingers 26 of the cylinder.

The pickup cylinder 23 includes end cylinder plates 27, which are rigidly mounted on a transversely extending supporting shaft 28. This shaft extends beyond the cylinder plates 27 and is journaled in suitable bearings 29' carried by the beams 21. Rotatably supported at spaced points around the cylinder plates 27 are finger bars 29 on which are secured the resilient pickup fingers 26. The terminals of the finger bars 29 at one side have formed thereon cranks 30, and these cranks carry cam lugs 31, which are adapted to travel around the periphery of a cam 32, which is formed on one of the bearings 29'. Thus, during rotation of the pickup cylinders, the fingers 26 will be turned so as to properly engage and pick up the material and travel through the cleaning slots 25.

The cylinder is rotated by means which will be later set forth, but it is to be noted by referring to Figure 4 that the cylinder shaft 28 is provided with a sprocket wheel or the like 33, around which is trained a sprocket chain or belt 34. The extreme forward end of the beams 21 carry depending ground-engaging shoes 35, and these shoes can be braced in any preferred manner.

Directly in rear of the feed table 22, the machine carries a cutting mechanism 36 and the upper and lower feed rollers 37 and 38 for delivering the material to the cutting mechanism.

In order to convey the picked-up material from the fingers 26 to the feed rollers, the table is provided with suitable elevating or conveying mechanism. This mechanism may comprise a centrally disposed endless feed apron 39, one run of which travels over the upper surface of the table. This feed apron is provided with suitable flights 40, and the opposite ends thereof travel over suitable rollers or sprocket wheels 41 and 42. The rollers or sprocket wheels 41 and 42 are keyed or otherwise secured to transversely extending upper and lower shafts 43 and 44, which are rotatably mounted in suitable bearings carried by the frame beams 21.

In order to take up slack in the feed apron, an idle roller or the like 45 engages the lower run thereof, and this roller is carried by arms 46. The arms 46 are, in turn, rockably mounted on certain of the frame plates 19. Contractile coil springs 47 are utilized for normally urging the idle roller in a downward direction. The lower shaft 43 of the feed apron has keyed or otherwise secured thereto a sprocket wheel 48, and the sprocket chain 34 is trained thereover. It can be seen that the pick-up cylinder is driven from the feed apron.

The feed apron is centrally disposed on the feed table, and as the feed table flares outwardly to provide the large forward end to accommodate the corn bundles or loose hay, it is necessary to provide side conveyors 49 on the table on each side of the feed apron.

These side conveyors 49 are in the nature of endless chains, and the chains carry prongs or fingers 50, which ride through longitudinally extending slots 51 in the feed table 22. The forward ends of the chains 49 are trained over suitable sprocket wheels carried by the lower shaft 43, and the rear ends of the chains are trained over sprocket wheels 52 carried by a transversely extending shaft 53. The shaft 53 is rotatably mounted in adjustable bearings 54, slidably mounted on the frame beams 21. A take-up means embodying a spring 55 is employed to eliminate slack in these chains, and the springs are connected with the adjustable bearings and the frame beams 21.

The cutting mechanism 36 includes a cutting cylinder 56 mounted in rear of the feed rollers 37 and 38. The cutting cylinder can consist of end hubs 57, keyed or otherwise secured to a shaft 58, which is rotatably mounted in bearings carried by frame plates secured to the beams 20. The hubs 57, in turn, support removable spiral cutting blades 59, which are adapted to sweep past a cutter bar 60 located in rear of and between the feed rollers 37 and 38. A sharpening bar can also be provided for the cutting knives.

The entire cutting mechanism can be housed within a suitable casing, and the lower end of the housing opens out to a conveying mechanism, such as an endless carrier, or, as shown, a blower 62. The casing 63 of the blower is disposed laterally of the cutting mechanism, and its inlet end is provided with an apron, which communicates with the lower end of the housing for the cutting mechanism.

The outlet end of the blower is provided with blower pipes 64, which can lead to a trailer wagon 65. In the illustration shown in Figure 1, the blower pipes 64 extend rearwardly, and the wagon 65 is coupled to a drawbar on the frame of the machine by the use of a suitable reach pole. If preferred, motor trucks can be driven alongside or in rear of the machine, and the blower can thus extend rearwardly or laterally. Where endless conveyors are utilized, the conveyors can extend either rearwardly or laterally. The blower shaft 66 extends in rear of and parallel with the cutter shaft 58 and is operatively connected to said cutter shaft, so that the blower can be driven thereby, by means of a pulley belt 67 and pulley wheels 68 and 69, keyed respectively to the cutter shaft and the blower shaft.

The upper feed roller 37 is preferably corrugated and is keyed or otherwise secured to a transversely extending shaft 70, which is slidably mounted in slots 71 formed in side frame plates. The shaft 70 is rotatably mounted on the rear ends of links or arms 72, which are, in turn, rockably mounted on the transversely extending treader shaft 73. The treader shaft 73 is rotatably mounted in bearings carried by the side frame plates of the machine, and this shaft has secured thereto the treading roll 74. This roll can be provided at spaced intervals with material-engaging teeth, and the roll is located directly above the rear end of the feed table 22 and in front of the feed rollers 37 and 38.

The upper feed roll 37 and the treading roller 74 are driven in unison, and this is brought about by the use of a sprocket chain 75, which is trained over sprocket wheels 76 and 77 keyed or otherwise secured to the upper feed roll shaft 70 and the treading roll shaft 73. The upper feed roll 37 is normally urged into engagement with the lower feed roll 38 by the use of coil springs 78. The springs 78 are placed about rods 79, the upper ends of which pivotally engage the links or arms 72, which carry the upper feed roll. These rods 79 loosely extend through guides 80 carried by the frame beams, and the springs 78 are confined between said guides and adjustable nuts 81 threaded on the rods 79.

The lower feed roll 38 is keyed or otherwise secured to a feed roll shaft 82, which is rotatably mounted in suitable bearings carried by the side frame plates, and one end of the shaft has keyed or otherwise secured thereto a pinion 83, which constantly meshes with a gear wheel 84, keyed or otherwise secured to a counter or idle shaft 85 rotatably mounted in bearings carried by the side frame plates. This shaft 85 has also keyed thereon a sprocket wheel 86, around which is trained a sprocket chain 87. This sprocket chain 87 is employed for driving the upper beater roll 88. The upper beater roll 88 is keyed or otherwise secured to a beater shaft 89 carried by bearings secured to brackets 90. These brackets 90 are bolted or otherwise secured to the side frame plates.

The beater roll 88 carries outwardly extending material-engaging fingers 91, and the roll is located in advance of and above the treading roll 74. This beater roll serves as means for leveling off the straw or other material and to feed the top straw or other material down to the treading roll. The treading roll tends to pack the loose straw and then feed the straw to the feeding rolls 37 and 38, where the material is held until cut. The beater roll shaft 89 has keyed or otherwise secured thereto a sprocket wheel 92, around which is trained the upper end of the sprocket chain 87.

The machine is adapted to be drawn from a tractor T, and hence the frame of the machine carries forwardly extending reach poles 93 and 94. The forward ends of these poles are rigidly united together, and a suitable clevice is provided to permit the connection thereof to the drawbar of the tractor. These reach poles are braced together in any desired manner, and the reach pole 94 extends straight back to the tubular axle 16, and is hingedly connected thereto, as at 95. The rear end of this reach pole carries suitable brace plates 96. The reach pole 93 inclines rearwardly and inwardly and is pivotally connected to the axle 16, as at 97. These reach poles carry the control mechanism for the machine, which will be later set forth.

The operating parts of the machine can be driven from an internal combustion engine placed upon the frame of the machine, or the operating parts of the machine can be driven from the power take-off shaft of the tractor. Such is preferred in some instances, and, as illustrated, I have provided a forwardly extending drive shaft 98, and the forward end of the shaft is coupled through the use of universal joints with the tractor power take-off shaft.

The shaft 98 extends rearwardly to a gear housing 99 rigidly mounted on the frame of the machine. This gear housing supports the main drive shaft 100, and the shafts 98 and 100 are connected by beveled gearing arranged in the gear housing 99. The shaft 100 is united directly with the cutter shaft 58, but the drive shaft has interposed in the length thereof universal joints 101 at spaced points, and a frangible coupling 102 can also be interposed in the length of the shaft. The lower feed roll shaft 82 extends laterally for a considerable distance beyond its inner frame plate and has connected therewith a relatively large gear wheel 103. This gear wheel is driven from the main drive shaft 100 through the use of a suitable mechanism 104, which is employed for driving the gear wheel 103 in reverse directions and to bring about the stopping of the drive of the shaft 82.

The mechanism 104 includes a swinging head 105 carrying stub shafts 106 and 107 on opposite sides of the pivot 108 for the head 105. These stub shafts 106 and 107 have rotatably mounted thereon intermeshing pinions 109 and 110. The pinion 110 carries a sprocket wheel 111, around which is trained a sprocket chain 112. This sprocket chain 112 is in turn trained about a sprocket wheel 113 keyed or otherwise secured to the main drive shaft.

The head 105 below its pivot has formed thereon an operating arm 114, to which is pivotally connected an operating link 115. By moving the head on its pivot, either one of the pinions 109 or 110 can be brought into meshing engagement with the gear wheel 103, or, as shown in Figure 9, both of the pinions can be moved to a neutral position out of engagement with the gear wheel 103. Obviously, when the gear wheel 110, which constitutes the normal direct drive, meshes with the gear wheel 103, the said gear wheel and the shaft 82 will be driven in a clockwise direction (referring to Figure 9). When the pinion 109 is brought into meshing engagement with the gear wheel 103, the said gear wheel and the shaft 82 will be driven in a counterclockwise direction.

The pivot 108 for the swinging head or swivel plate 105 is carried by an adjustable plate 145 rockably mounted on shaft 82. The adjustable plate 145 is adjustably bolted, as at 146, to the gear housing 116, so that the chain or other means of drive 112 may be adjusted for various sized sprockets 111. The shaft 82 extends through this housing and has keyed or otherwise secured thereto a drive gear 117 positioned in said housing. This gear 117 meshes with a gear 118, which is also located in said housing, and this gear wheel 118 is keyed or otherwise secured to the upper roll shaft 70.

To bring about the drive of the feed belt 39 and its associated mechanism, previously described, the upper shaft 44 for said feed belt is operatively connected to the lower feed roll shaft 82. Thus, the feed roll shaft 82 has keyed or otherwise secured thereto a sprocket wheel 119, around which is trained a sprocket chain 120. This sprocket chain 120 is in turn trained about a sprocket wheel 121, formed on or secured to a clutch hub 122. The clutch hub 122 is rotatably mounted on the shaft 44, and the clutch hub is adapted to engage a companion clutch hub section 123 feathered on the shaft 44. An expansion spring 124 is utilized for normally urging the clutch hub section 123 into engagement with the clutch hub 122.

When the lower feed roll 82 is directly driven for feeding the material to the cutter, the clutch teeth of the hubs 122 and 123 engage so as to bring about the operation of the feed belt and its associate parts. However, when the lower feed roller has its direction reversed for carrying material away from the cutting mechanism, the teeth of the hub 122 merely ratchet over the teeth of the hub section 123.

Referring briefly to the driving mechanism, it can be seen that the cutter is directly driven from the main drive shaft 100, and that the blower is driven from the cutter shaft through the belt 67. The drive from the shaft 100 is transferred to the shaft 82 of the lower feed roll through the reversing and idling mechanism 104. This lower shaft 82, in turn, drives the feed belt, and the feed belt operates the pickup mechanism and the side conveyor chains 49.

The top beater roll 88 is driven from the shaft 85 by the chain 87, and this shaft is in turn driven from the lower feed roll 82 through the intermeshing gears 83 and 84. The upper roll shaft 70 is driven from the shaft 82, through the intermeshing gears 117 and 118, and the top roll shaft 70 operates the treading roll through the belt 75.

To permit the driving mechanism to be controlled from the front of the machine, a hand lever 125 is provided. This hand lever is pivotally mounted at its lower end, as at 126, on one of the drawbars 93 or 94, and this lever is located within convenient reach of the operator of the tractor. Extending rearwardly from the lever 125 above its pivot is a link 127. The rear end of the link is pivotally connected to the outer end of a double-armed lever 128. The lever 128 is rockably mounted intermediate its ends, as at 129, or the frame of the machine, and the inner end of the lever has pivotally connected thereto the link 115, which is connected to the arm 114 of the swinging head 105. Thus, by moving the hand lever 125 back and forth, the head 105 can be swung on its pivot so as to bring either one of the pinions 109 or 110 into engagement with the gear 103, or to a disengaged neutral position, as shown in Figure 9.

To adjust the frame on the axle 16, so that the shoes 35 can be raised and lowered, a hand lever 130 is provided. This lever 130 is also rockably mounted on the pivot pin 126 and is located adjacent the hand lever 125, so that the same can be operated by the driver of the tractor.

Extending rearwardly from the hand lever 130 is a rod 131, and this rod is pivotally connected to the upper end of one arm of a bell-crank 132. The bell-crank 132 is rockably mounted at its angle, as at 133, on the beam 94 and is pivotally connected by means of a U-shaped link 134 with a forwardly extending frame beam 135, which is rigidly connected to one of the axle plates 19. The rod 131 is provided with a hooked terminal 136 for engaging about the hand lever 130, whereby a direct pull can be exerted on the rod and the bell-crank 132. Coiled about the rod is a spring 137, and one end of the spring bears against an adjustable stop 138 on the rod, and the other end of the spring bears against a pivoted guide bracket 139 secured to the hand lever 130. The spring 137 keeps the shoes down when going up-grade, and allows the shoes and the pickup mechanism to follow the contour of the ground surface.

The weight of the machine is so distributed that only a very small part of it is supported by the tractor drawbar. The rest of the weight of the frame is balanced over the axle 16 in such a manner that the height of the pickup mechanism and shoes can be readily regulated by the hand lever 130 with its compensating spring adjustment 137. By manipulating the lever, the pickup shoes can be made to practically float over the ground or to clear the ground entirely and permit the fast moving of the machine from one field to another.

The hand lever 130 can be held in any preferred adjusted position by means of a spring-pressed dog 140, which is adapted to engage in any one of a plurality of openings or notches formed in a sector bar 141 secured to the beam 94. The dog 140 is manipulated from a pivoted finger grip 142 by the use of suitable intermediate mechanism. Obviously, when the lever is pulled forwardly, the bell-crank is rocked, which pushes up on the frame beam 135. When the lever 130 is pushed rearwardly, the bell-crank pulls down on the frame beam 135.

From the foregoing description, it can be seen that I have provided a novel unitary machine for picking up crops from a field, conveying the crops to a cutter, and then delivering the cut material to following wagons.

Changes in details may be made without departing from the spirit or the scope of my invention, but what I claim as new is:

In a harvesting machine, a cutting mechanism, a main drive shaft, means for operating the cutting mechanism directly from said drive shaft, a lower feed roll, an upper feed roll, a treading roll, means for operating the treading roll from one of the feed rolls, a main drive gear on the shaft of one of said feed rolls, means operatively connecting the feed rolls together, a swinging head, intermeshing pinions rotatably carried by the head, means operatively connecting one of the pinions to the drive shaft, and means for swinging the head to position both of the pinions out of engagement with the main drive gear, or either one of said pinions into engagement with the drive gear.

ERWIN W. SAIBERLICH.